Figure 1:
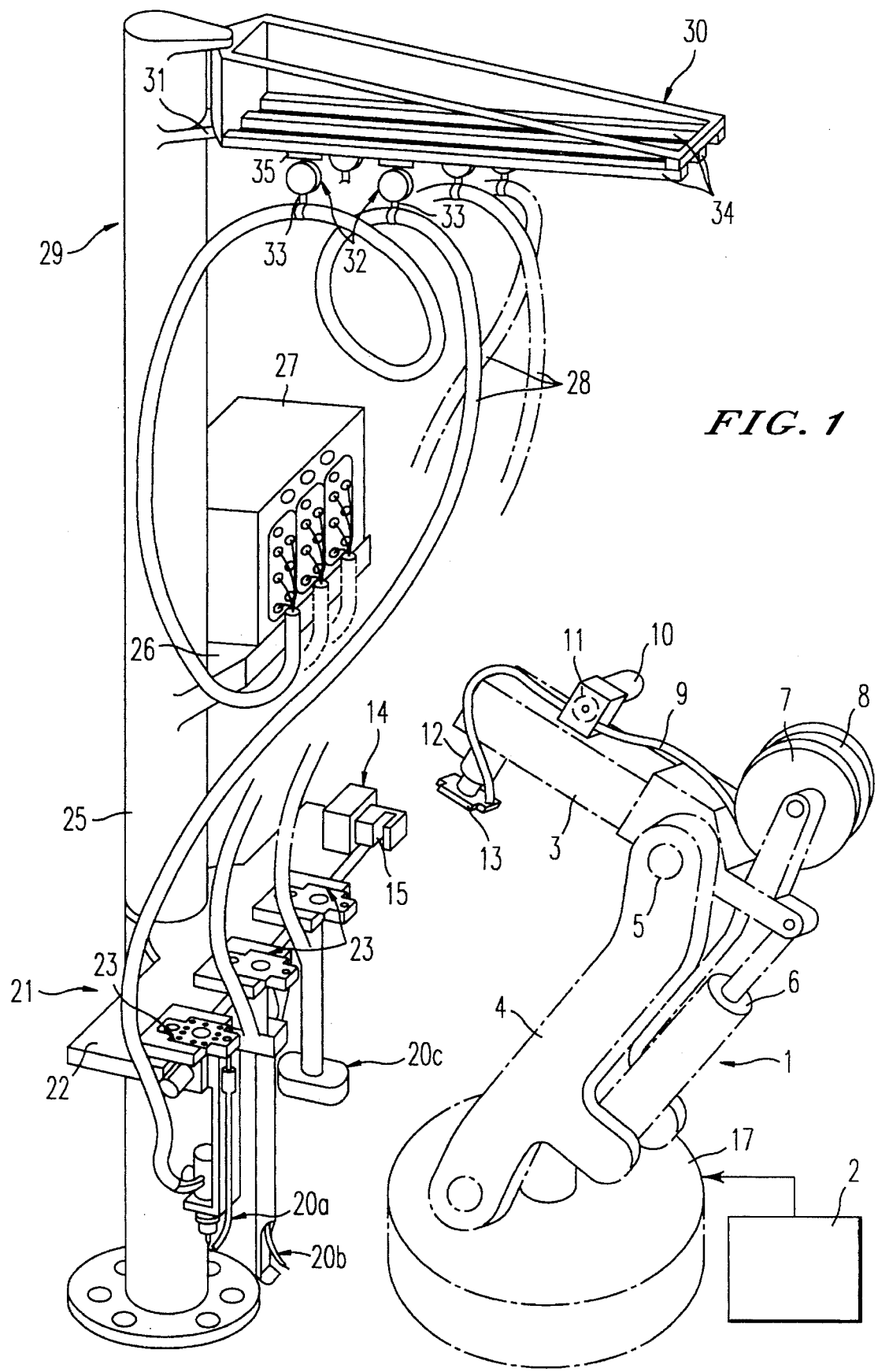

United States Patent [19]
Arantes et al.

[11] Patent Number: 5,512,726
[45] Date of Patent: Apr. 30, 1996

[54] AUTOMATIC WELDING INSTALLATION

[75] Inventors: Antonio C. Arantes, Ste Genevieve Des Bois; Francois Pierquin, Mennecy; Pierre M. P. Ruault, Fleury Merogis, all of France

[73] Assignee: Societe Nationale D'Etude et de Construction de Moteurs D'Aviation "Snecma", Paris, France

[21] Appl. No.: 409,683

[22] Filed: Mar. 23, 1995

[30] Foreign Application Priority Data

Mar. 24, 1994 [FR] France .................................. 94 03435

[51] Int. Cl.⁶ ....................................................... B23K 9/12
[52] U.S. Cl. ................... 219/125.1; 219/136; 219/137.2; 901/42
[58] Field of Search ............................... 219/125.1, 136, 219/137.2, 137.7; 901/30, 42

[56] References Cited

U.S. PATENT DOCUMENTS

| | | | |
|---|---|---|---|
| 4,492,847 | 1/1985 | Masaki et al. ............................. | 901/42 |
| 4,539,465 | 9/1985 | Bosna ........................................ | 901/42 |
| 4,604,787 | 8/1986 | Silvers, Jr. ................................ | 901/30 |
| 4,645,901 | 2/1987 | Scholz et al. ........................ | 219/125.1 |
| 4,737,611 | 4/1988 | Humblot .................................... | 901/42 |
| 4,883,939 | 11/1989 | Sagi . | |
| 4,917,619 | 4/1990 | Nishiwaki . | |
| 5,194,716 | 3/1993 | Appendino ................................ | 901/42 |

FOREIGN PATENT DOCUMENTS

| | | |
|---|---|---|
| 0515069 | 11/1992 | European Pat. Off. . |
| 2587930 | 4/1987 | France . |
| 3400111 | 8/1985 | Germany . |

*Primary Examiner*—Clifford C. Shaw
*Attorney, Agent, or Firm*—Oblon, Spivak, McClelland, Maier & Neustadt

[57] ABSTRACT

Automatic welding installation where a robot arm (1) is equipped so as to be able to seize one or other of several torches (20) serving to fulfil different tasks and positioned on a rack (21). Assembly means are provided for ensuring the continuity of all the functions without any external intervention. In particular there are connections for guiding the filler wire (8) and reversibly locking the torches to the assembly face (13) of the arm (1).

25 Claims, 10 Drawing Sheets

AUTOMATIC WELDING INSTALLATION

DESCRIPTION

The invention relates to an automatic welding installation.

Its essential aim is to allow replacements of welding torches without manual intervention, i.e. solely by the arm of the robot responsible for the welding and which carries the torches. The invention is particularly advantageous in those situations where the variety of the parts to be welded makes it necessary to periodically change the torch, but can also be used whenever it is necessary to replace the welding torch by another tool.

At present the procedure consists of successively screwing the torches to the arm and then manually unscrewing them, which takes a long time and involves a member of staff. It is also necessary to screw or unscrew the end of a flexible sheath carried by the robot arm and which guides the filler wire, whereof a reserve is wound onto the arm and supplied automatically as a function of needs to a guide conduit for the wire, more briefly called a wire guide, which is fixed to the torch and which stops close to the gas blowing nozzles or the arc creating electrode.

Thus, the invention consists of modifying the arm and the torches so that they can be assembled automatically and reversibly and without having to fear implementation deficiencies with respect to this operation. Use is not made of bolted assemblies for the arm and torches and they are replaced by other means.

However, an automatic welding installation where a robot arm is able to seize different torches on a rack by connecting thereto in order to supply electricity, fluid or filler wire is described in U.S. Pat. No. 4,883,939. However, it is only usable for MIG welding processes, where the filler wire is supplied in the centre of the guide conduit for a gas blown onto the melting bath and itself serves as an electric arc forming electrode. This process is easily performed, because the constantly advanced filler wire is melted at a rate varying as a function of the real welding conditions, but which maintain the same at a distance from the parts to be welded favourable for creating the arc. Thus, the electrical and thermal phenomena exert an automatic control of the distance between the wire and the welded parts, and the arc.

The conditions change in other welding processes such as TIG or plasma processes, where the arc is created by an electrode which is separate from the wire and is not consumed. It is then necessary to maintain the electrode at a constant distance from the parts to be welded, which cannot be done by the robot arm because it performs an invariable trajectory and does not correspond exactly to the shape of the parts if successive welding takes place of parts differing slightly within a batch or if the trajectory has not been accurately defined. The known machines and installations do not offer a solution to this problem of constantly regulating the distance of the electrode, whilst guiding the wire to an invariable electrode position on the basis of a wire guide separate from the electrode and the nozzle carried by it.

The invention makes it possible to solve this problem, but can also be applied to other processes where the end of the torch or tool has to follow a trajectory differing slightly from that of the robot arm.

In its most general form, the invention relates to an automatic welding installation comprising a robot arm provided with a control device and an assembly face for welding torches in a random number and provided with an assembly face, as well as a rack having stowing locations for the torches. The arm has a filler wire magazine, a wire advance device, a wire guide conduit fixed to the assembly face and an automatic, reversible locking means for each of the torches to the arm. The torches comprise a wire guide conduit. The assembly faces of the arm and the torches comprise engaging or fitting in means for a single assembly position for which, as the assembly faces are coupled and locking completed, the guide conduit of the wire of the locked torch extends the guide conduit of the wire of the arm.

It is then possible to programme the control computer of the robot arm in such a way that it seeks a torch at its stowing location, because its position is known, or conversely for depositing it there. The filler wire can be advanced in the wire guide of the torch which has just been chosen and fitted on the arm as a result of the continuity of the fixed and mobile parts of the guide wire and there is no need to fear an incorrect positioning of the torch on the arm, due to the engaging means.

The originality of the invention is based on the fact that the torches comprise a mobile tip or nose and connected to another part of the torches, to which belongs the assembly face, by a mechanical, distance regulating connection and the guide conduit of the wire of the torches is constituted by a part fixed to the nose and a part fixed to the other part of the torches, the two parts of the guide conduit sliding in one another. Thus, the electrode or more generally the end of the tool is displaced independently of the tool and the wire remains guided by the wire guide over its entire length.

The distance regulating device can be controlled with the aid of the arc voltage. If the voltage is excessive the torch is moved back from the parts to be welded and vice versa, this being known per se.

The invention is described in greater detail hereinafter relative to non-limitative embodiments and the attached drawings, wherein show:

FIG. 1 A general view of the elements of the system.

Figure 2:
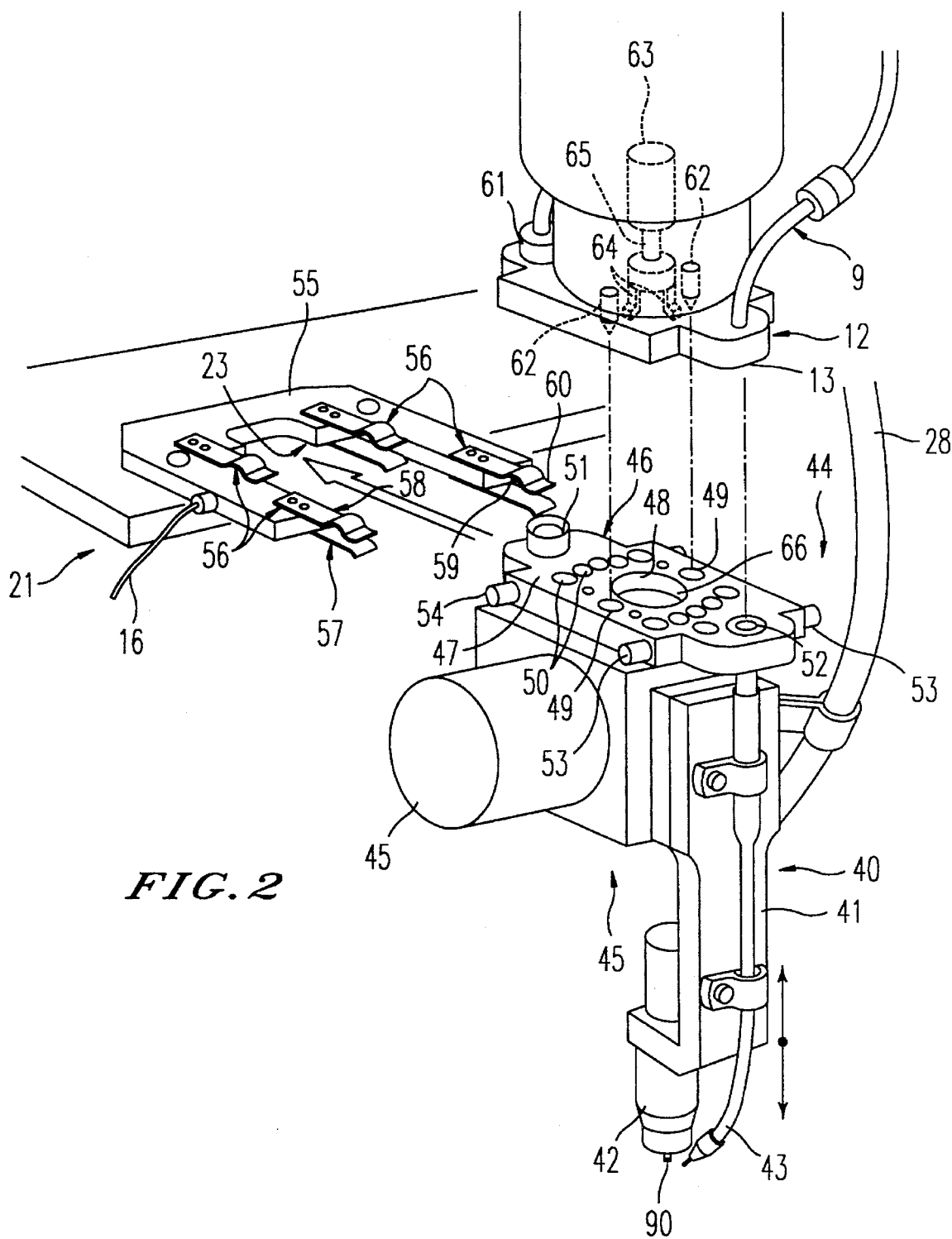

FIG. 2 In greater detail the torch and its stowing location.

Figure 3:
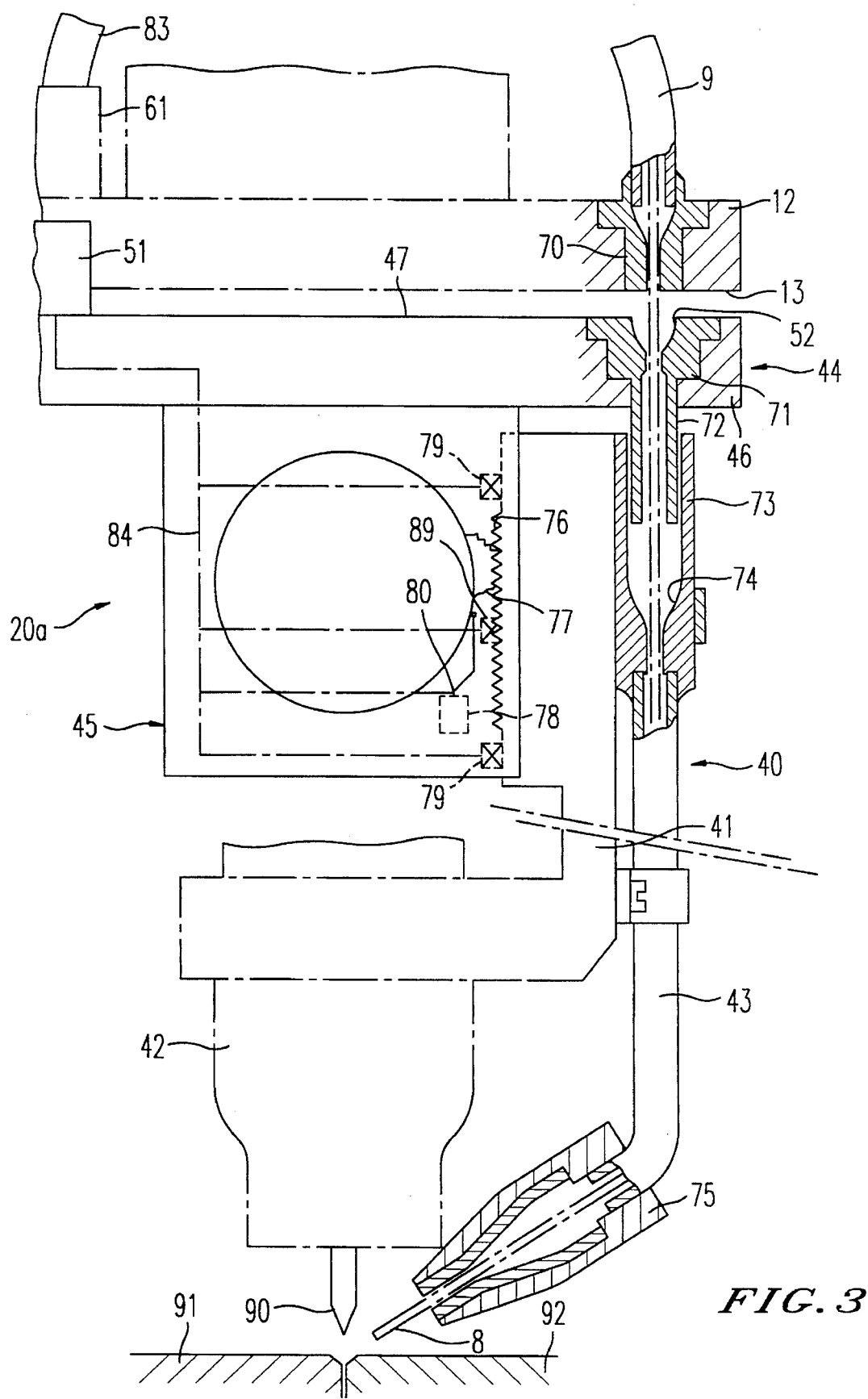
Figure 4:
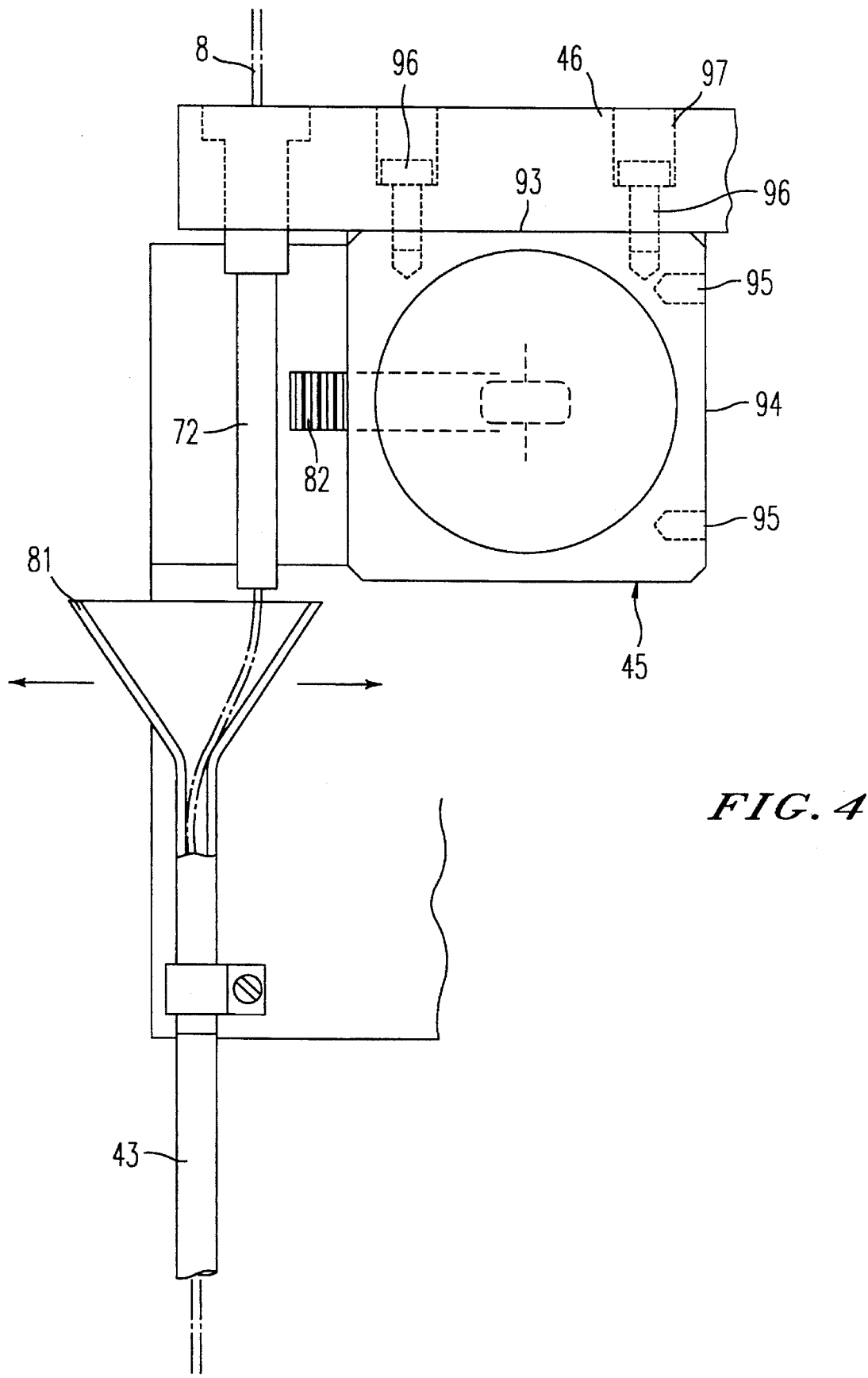

FIGS. 3 and 4 The wire guiding procedure.

Figure 5:
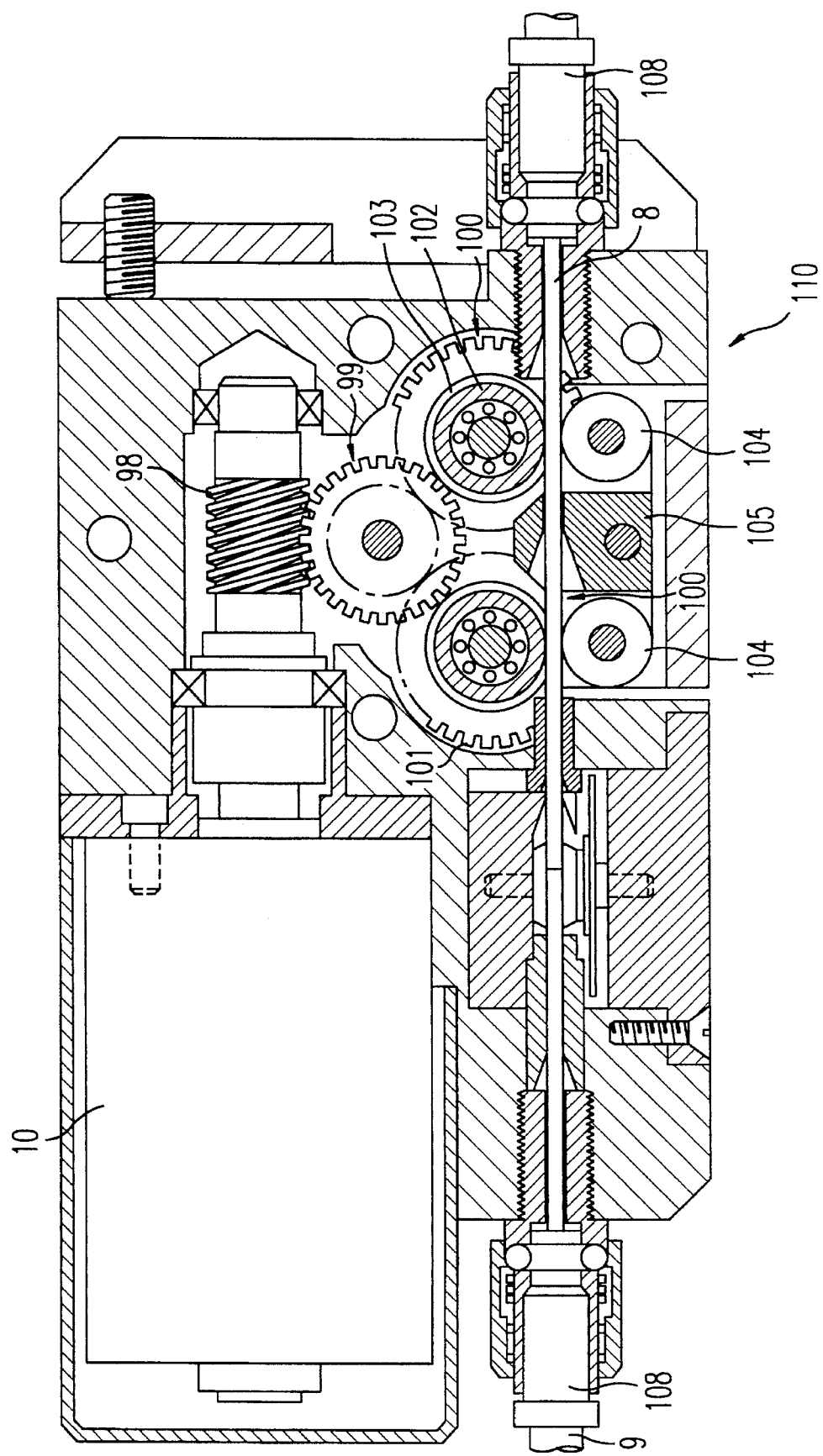
Figure 6:
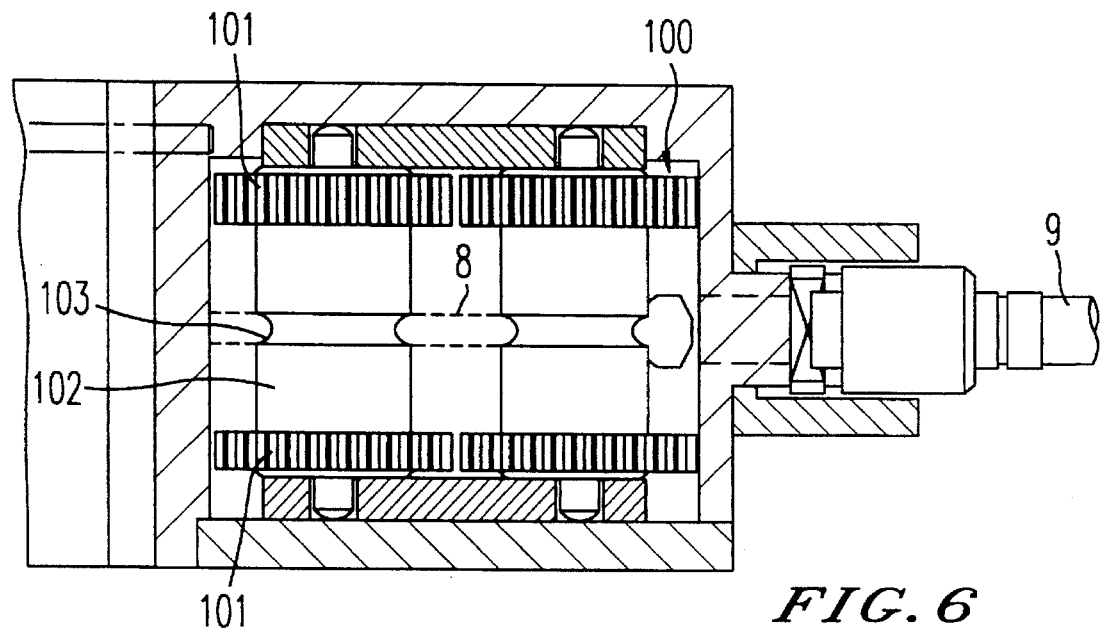
Figure 7:
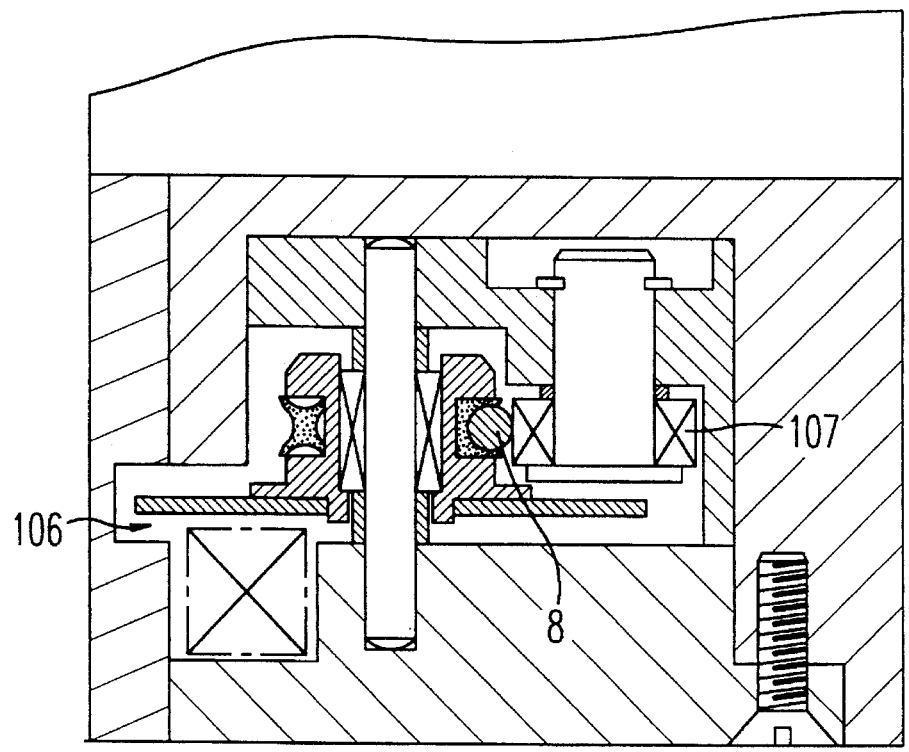

FIGS. 5, 6 and 7 An improved wire advance device.

Figure 8:
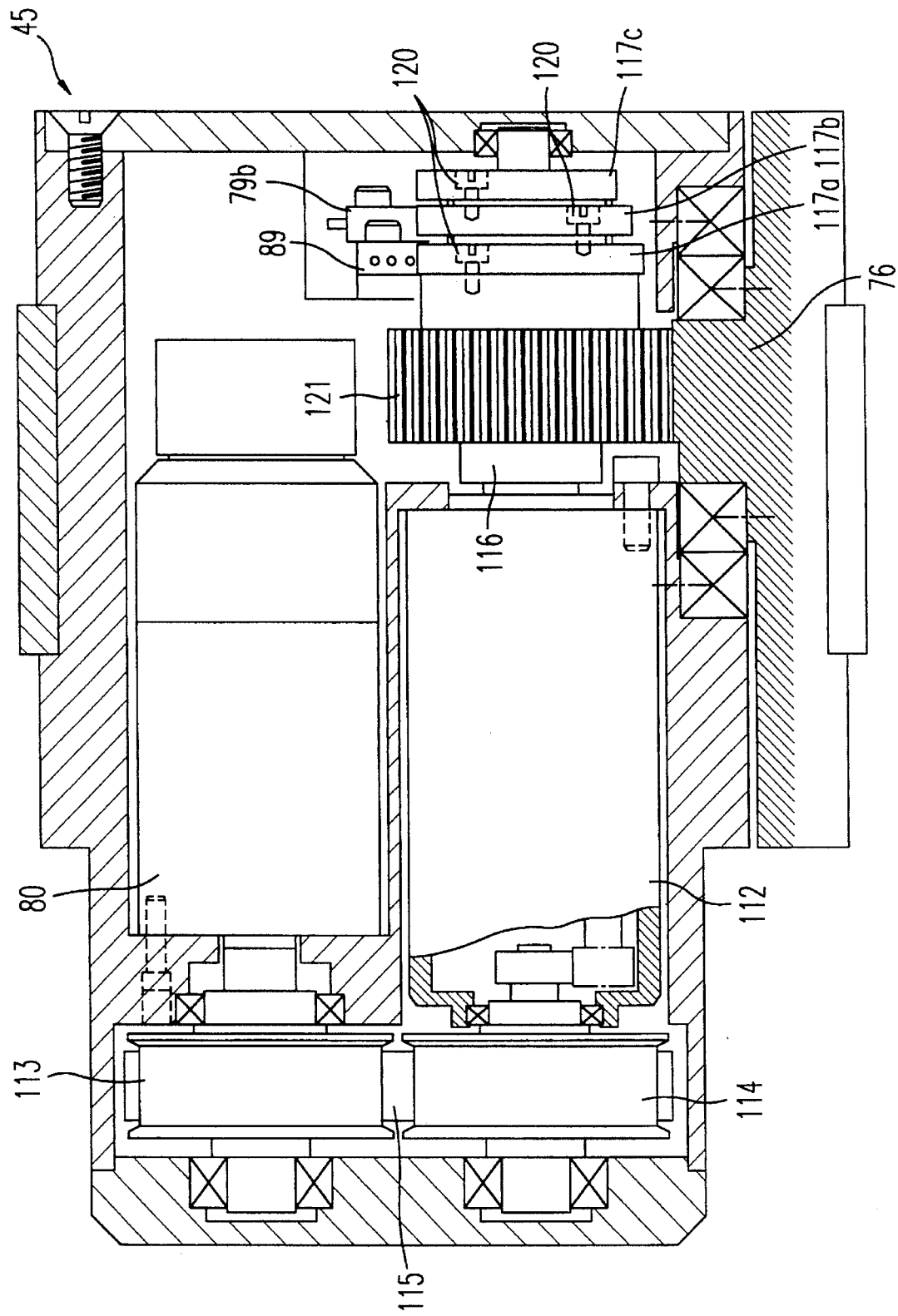
Figure 9:
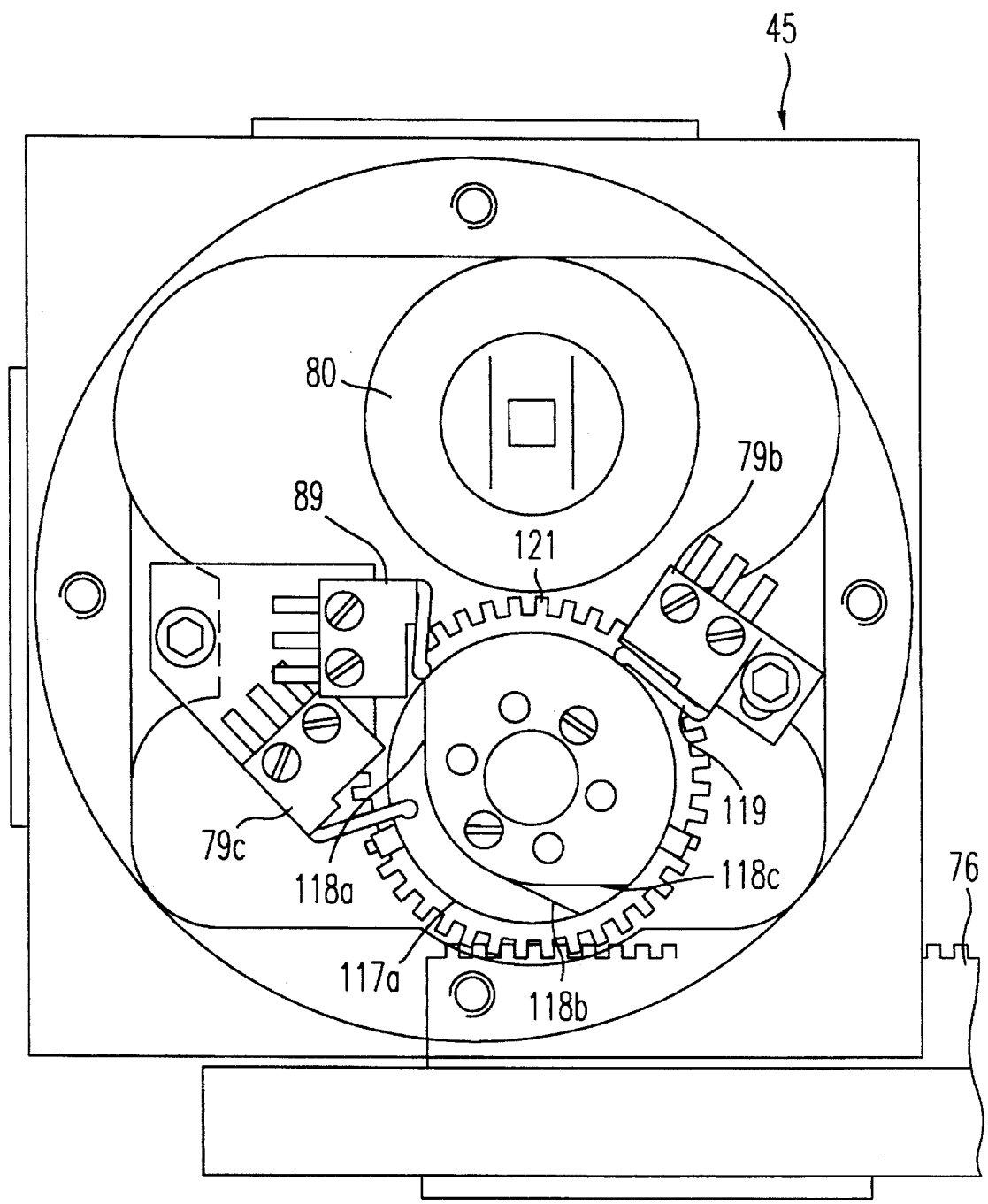

FIGS. 8 and 9 In detail an embodiment of the torch distance regulating device.

Figure 10:
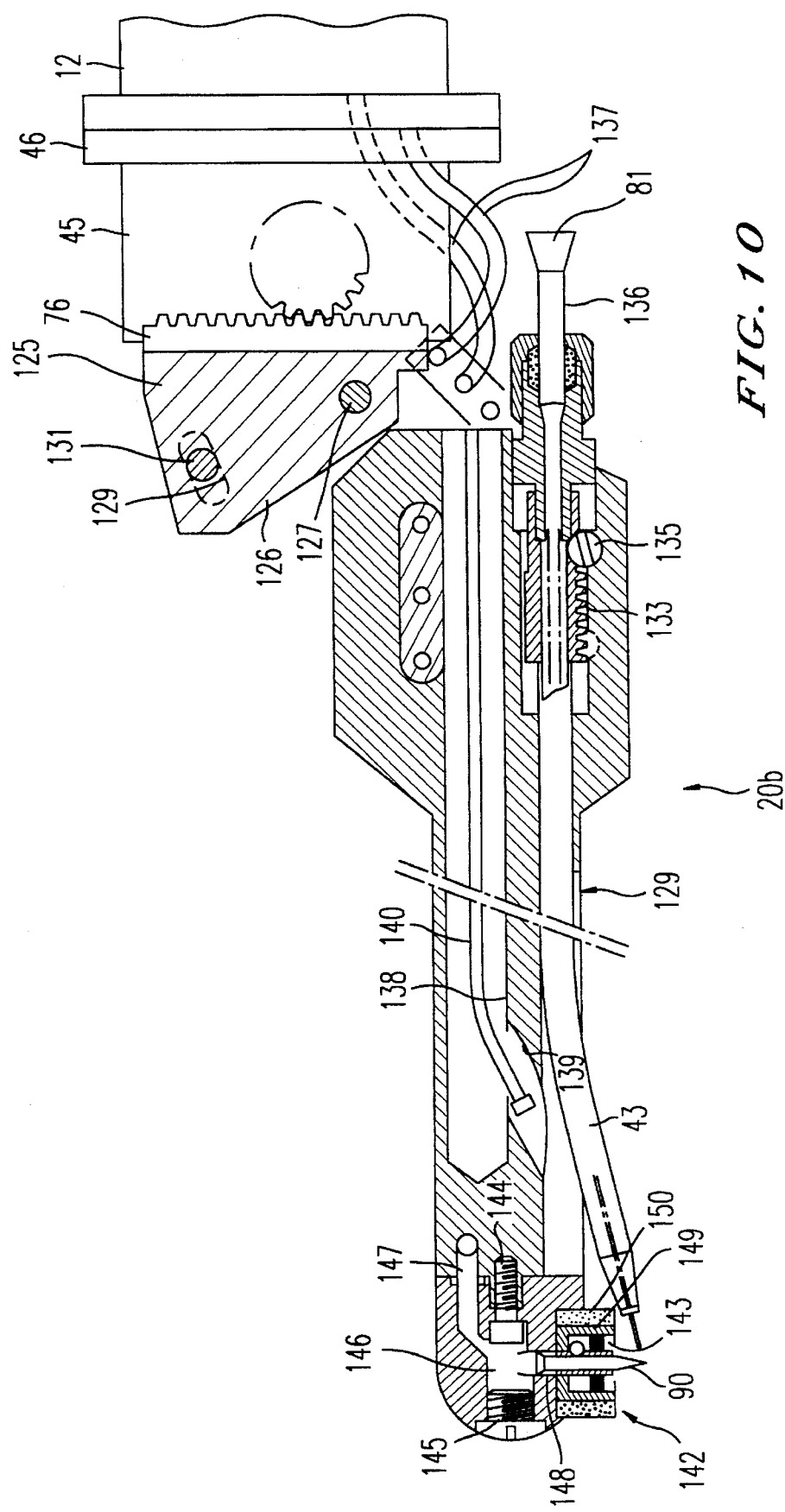
Figure 11:
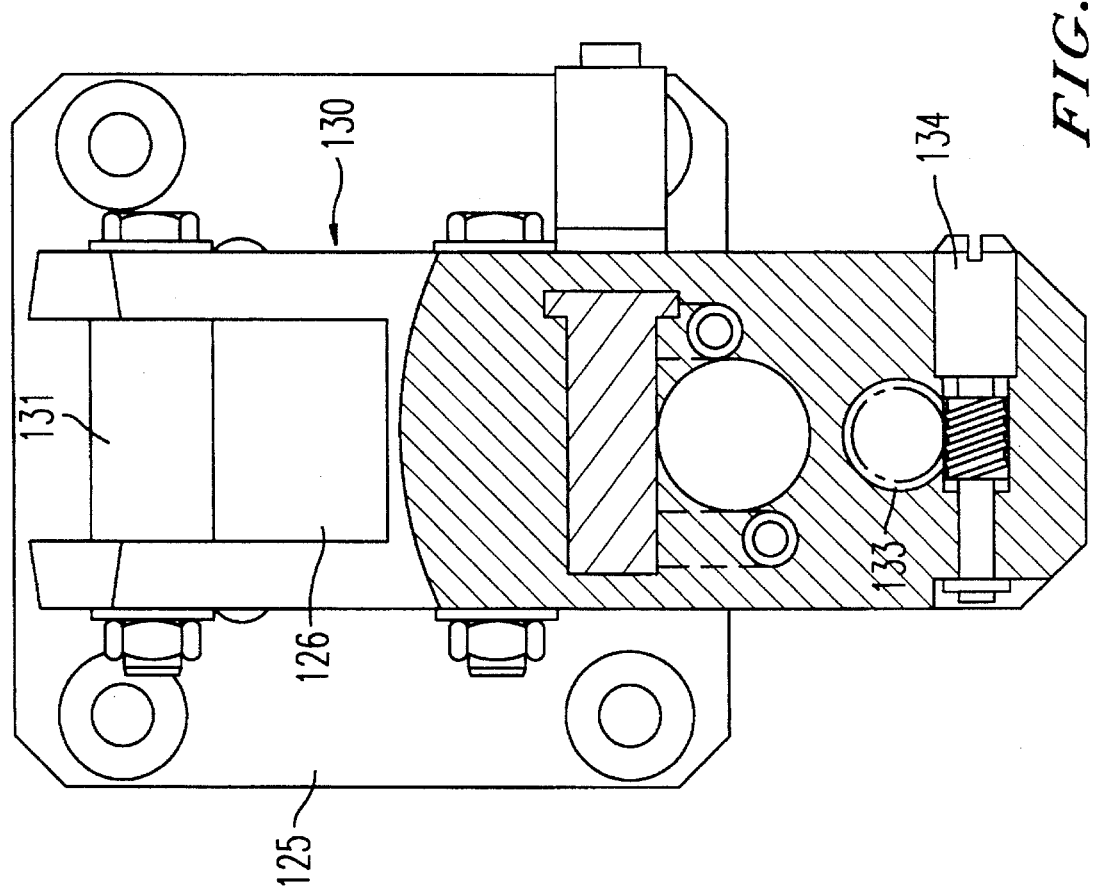

FIGS. 10 and 11 A special torch with an improved design.

The active element of the welding installation is a robot arm 1 controlled by a computer 2, which controls its movements and the state of its operation. The arm 1 is constituted by several sections articulated to one another and mobile in order to give it the desired agility. All that is shown here is the distal section 3 and the section preceding it 4, the remainder of the arm being symbolized by a base 17, because many suitable robot arm types already exist. The sections 3 and 4 are articulated about a spindle 5 and their movements are governed by a jack 6, which is articulated thereto by its two ends. The distal section 3 carries a reel 7, which forms a filler wire reserve 8. The free end of the wire 8 is threaded into a wire guide 9 passing along the distal section 3 and which is in the form of a flexible, tubular sheath. The guide wire 9 is interrupted at the location of a motor 10, which drives a roller 11 or a means of the same type in order to pull the wire 8 by rubbing thereon. The distal section 3 is terminated by an end piece 12, which stops at a planar assembly face 13 into which is introduced the end of the wire guide 9.

Torches 20, which will be described hereinafter, are put into service after being fixed to the assembly face 13. These torches 20 can be of several types and three different types 20a, 20b and 20c are shown in FIG. 1. They are placed on a rack 21 essentially constituted by a shelf 22 onto one side of which open the stowing compartments 23. A presence sensor 16, visible in FIG. 2, is associated with each stowing compartment 23 and is connected to a computer 2 indicating to it if the compartment is empty for receiving an abandoned torch 20. The shelf 22 also carries a shear serving as a wire cutter 14. This means is used after a welding process, at least when the torch has to be changed. A ball of melted and then solidified material is formed at the end of the wire 8 and it prevents the moving back thereof, because it might be blocked in the torch wire guide to be described hereinafter. Thus, the torch is brought onto the wire cutter 14 and the wire 8 is advanced into its slit 15, where are located a shear and a photoelectric detector, which are not shown. The detector detects the presence of the wire 8 and commands the shear to close thereon, which cuts the end of the wire 8. The coil of wire 8 can then be made to move out of the torch 20. It can be seen that there is no difficulty with respect to these operations, because it is merely necessary to correctly position the torch 20, the wire cutter 14 being at a known position.

The shelf 22 is fixed to a post 25 carrying another shelf 26 on which is placed a control cabinet 27 used for the selective distribution of gas, water and electricity to the torches 20 by means of flexible conduits 28, which connect the same to the control cabinet 27. A disorderly dispersion of the flexible conduits 28 is prevented by means of a bracket 29 formed at the top of the post 25 and which dominates the remainder of the installation. The bracket 29 is essentially constituted by an overhanging beam 30 articulated to the post 25 about a vertical spindle 31 and which carries the pulleys 32 to which the flexible conduits 28 are attached by spring cables 33, which expand as soon as the flexible conduits 28 are pulled and lowered by the arm 1, when it carries the torches 20, but which raise the conduits 28 to their starting position as soon as the torches 20 are released. The beam 30 is also provided with tracks 34 enabling sleds 35, on which are suspended the pulleys 32, to slide along the beam 30. Other spring cables bring the sleds 35 to the start of the beam 30 against the post 25, if the generally rubber flexible conduits 32 do not have an adequate elasticity. With such a suspension it is easy to keep the flexible conduits 28 away from the other elements of the installation and in particular keep them above and aside from the arm 1. Thus, there is no risk of them being intermingled with other elements.

Reference is now made to FIG. 2, which illustrates one of the torches 20. In particular it is possible to see a tip or nose 40 constituted by a frame 41 carrying a gas projecting nozzle 42 (or the housing of an electrode 90 as a function of the envisaged welding process) and a lateral wire guide 43 on the frame 41 and extending alongside the nozzle 42, an upper part 44 to be assembled with the arm 1 and a distance regulator 45 connecting the upper part 44 to the nozzle 40. The distance regulator 45 is a means making it possible to advance or move back the nose 40 so that it remains at the desired distance from the part to be welded no matter what the movements imposed by programming on the arm 1, which may not be precisely parallel to the bead. In this case the upper part 44 is formed with an assembly plate 46 terminated by a planar assembly face 47, which is attached to the assembly face 13 of the end piece 12 of the arm 1. It can be seen that the assembly plate 46 is perforated and flush with the assembly face 47 is provided a central recess 48, lateral engagement cutouts 49, supply conduit cutouts 50 in two rows and towards the ends of the assembly plate 46 an electrical plug 51 and a wire guide mouthpiece 52 connected to the wire guide 43. Finally, two pairs of pins 53, 54 point laterally towards the outside close to the corners of the assembly plate 46. The pins 53, 54 are used for the stowing of the torch 20. For this purpose the shelf 22 carries, at each of the stowing compartments 23, a frame 55 carrying four clips or grippers 56. Each of the clips 56 is constituted by a straight, elastic, but relatively rigid lower strip 57 and an elastic, more flexible upper strip 58, whose median portion is curved in a boss-like manner 59 towards the top and whose free end 60 is also curved upwards. Two of the clips 56 are located at the end of lateral branches of the frame 55 at the entrance of the stowing compartment 23 and the two others are located on a crossmember of the frame 55 connecting the branches, at the bottom of the stowing compartment 23. If the torch 20 is introduced into the stowing compartment 23 with the necessary precision, the pins 53 penetrate the entrance clips 56 and the pins 54 penetrate the bottom clips. They are slid between the strips 57 and 58, force back the upper strips 58 by making them fold and are maintained beneath the bosses 59. The extraction of the torch 20 by an opposite movement is also performed without difficulty.

The supply conduit cutouts 50 serve to optionally supply gas or any other type of fluid to the torch 20 from the arm 1. When the assembly faces 13 and 47 are coupled, they come into the extension of similar conduits belonging to the arm 1. In the same way, the end face 13 of the arm 1 carries an electrical plug 61, which is connected to the plug 51 and makes it possible to supply electricity to the torches 20, the wire guide 9 being connected to the wire guide 53. The correct positioning of the assembly faces 13 and 47 is ensured by a pair of pegs 62 on the assembly face 13 of the arm 1 and which penetrate the engagement cutouts 49. Finally, the assembly face 13 of the arm 1 is provided with a pneumatic locking jack 63, which controls the displacement of three lugs 64 placed equidistantly on a circumference with a radiating arrangement, at the end of a rod 65 projecting beyond the assembly face 13 and penetrating the central recess 48 when the assembly is completed. More precisely the lugs penetrate a groove 66 made in the inner wall of the recess 48 when the active fluid of the jack 63, which extends through the rod 65, makes them spread out and they pass out of the same under the reverse action. Thus, the jack 63 is controlled by the computer 2 in order to reversibly lock the torch 20, or any random one of said torches, to the arm 1.

It is also pointed out that the coupling of the plugs 51 and 61 makes it possible to supply an identification signal with respect to the torch 20 which has been seized to the computer 2, which prevents any error, particularly if the torches 20 have been interchanged with respect to their compartments 23. Thus, the control cabinet 27 supplies a particular signal to each of the torches 20 in a permanent manner and this signal reaches the plug 51. When the computer 2 has identified the torch 20 seized by the arm 1, it acts on the control cabinet 27 in order to make its supply to the torch 20 the fluids necessary for its operation. This identification function is fulfilled by not shown, simple electronic means.

Reference will now be made to FIG. 3. The wire guide 9 of the arm 1 is terminated by a guide bush 70, which extends through the end piece 12 up to the assembly face 13 and connected at the guide wire mouthpiece 52 to the torch assembly 20. On being inserted into the assembly place 46, the guide wire mouthpiece 52 contracts into a guide cup 71 terminated by a tube 72, which is able to slide in a larger diameter tube 73, terminated by a funnel 74, of the wire guide 43, integral with the nose 40 and the frame 41 of the torch 20, whereas the tube 72 is integral with the upper part 44 of the torch 20. Following the fitting of the torch 20, the wire 8, which is constantly advanced prior to and during welding, is guided by the guide cup 71 and the funnel 74 and always reaches the end of the wire guide 43, which tapers in front of the nozzle 42 in order to form a guide piece 75. The electrode 90 is directed towards a joint having two mechanical parts 91, 92, which it is necessary to weld. The essential elements of the distance regulator 45 are shown, namely a rack 76 integral with the frame 41, a pinion 77 driven by an electric motor 78, as well as two end of travel sensors 79 at the ends of the rack 76, a median sensor 89 mid-distance of the aforementioned sensors alongside the rack 76 and a rotation sensor 80 measuring the movements of the pinion 77. The electric motor 78 vertically displaces the rack 76, which meshes with the pinion 77 and consequently adjusts the height of the torch 20, the nozzle 42 and the electrode 90 projecting beyond the same on the part to be welded. The frame 41 slides vertically beneath the upper part 44 by a not shown mechanical connection, which can be in the form of slides or columns. The sensors 79, 80 and 89 are connected to the computer 2 by the plugs 51 and 61, which join electric line sections 83, 84 belonging to the arm 1 and the torch 20 and make it possible to perform the adjustment of the torch 20 instead of using a purely autonomous servoloop based on the adjustment of the arc voltage to a fixed value, which is defined beforehand and according to which the computer 2 measures the arc voltage between the electrode 90 and the parts 91, 92 and acts on the electric motor 78 in order to displace the electrode 90.

A specific process for adjusting the height of the torch 20 prior to welding and which illustrates the interest of the sensors 79 and 89 is described hereinafter. Although it is true that it is sufficient to place the nose 40 at mid-stroke and then slowly move the torch 20 towards the parts to be welded in the manual mode, these possibilities do not exist in the entirely automatic operating mode. When a welding cycle commences, the computer 2 ignores the extension of the seized torch 20 and must seek abutments, which it does at high speed. The end of travel sensors 79 make it possible not to cause damage by coming into violent mechanical abutment and offer a better precision. The torch 20 is then positioned at mid-stroke and approaches the parts to be welded without any special precautions, because the median sensor 89 offers a certain reference ensuring that the torch 20 is not advanced and that the electrode 90 will not strike against the parts. The following stage is a slow displacement of the nose 40 in front of the parts in order to make the arc voltage dependent on a known, admissible value, in accordance with prior art processes, but it is possible here, as soon as this adjustment has been made, to replace the nose 40 midstroke by moving the robot arm 1 without moving the electrode 90. When the welding trajectory has been covered, there is consequently a displacement capacity of the nose 40 equal in both directions, which reduces risks of abutments as a result of imprecisions in the trajectory or in the dimensions of the parts 91 and 92. However, if said situation occurs, the end of travel sensors 79 detect it and stop the robot arm 1. An alarm is then given to warn the operator. However, if the welding cycle is completed without incident and without stopping the electric power supply which would have erased the content of the memories of the computer 1, it is sufficient to bring the nose 40 to mid-stroke by once again using the median sensor 89 in such a way that the torch can approach the following parts 91, 92 of the same batch. The median sensor 89 is necessary to ensure a precise resetting without accumulating the displacement measurement imprecisions of the nose 40. The trajectory of the robot arm 1 is, for each of the parts 91, 92 of the batch, identical to the programmed trajectory, to within a translation correction resulting from the aforementioned replacement of the nose 40 at midstroke just prior to the start of the welding cycle.

Other advantages of the sensors 79, 89 can occur in certain special situations as a function of the programming. It is in particular possible to impose on the arm 1 modifications of its programmed path on approaching admissible ends of travel, in order to replace the nose 40 closer to the centre of its travel and so as not to stop welding. During all these displacements, the sliding movement of the tubes 72, 73 in one another ensures a good guidance of the wire 8.

This position planning was specific to the torch 20a of FIG. 1, where the nozzle 42 is vertical and the adjustment of the torch position consists of an extension or retraction movement with respect thereto. For a torch such as 20b (FIG. 4), where the nozzle 42 is oriented perpendicular to the torch axis, the adjustment movement would be transverse. The guide tube 73 would then be replaced by a guide funnel 81, which would in fact be an extension of the funnel 74. The vertical rack 76 would be replaced by a horizontal rack 82 and the remainder of the system would remain unchanged. It is also possible to propose other systems for ensuring a correct guidance of the wire 8, depending on the possibilities of the torch 20.

The distance regulator 45 can be the same for all the torches 20 if it can be fixed to the assembly plates 46 by several faces such as the orthogonal faces 93, 94 in FIG. 4. These faces are provided with groups of taps 94 with identical arrangements and forming an extension of the cutouts 97 traversing the assembly plate 46. Screws 96 are engaged in the cutouts 97 and taps 95 in order to ensure the sought fixing action.

Other less important, but still interesting aspects of the invention will be described in connection with the following drawings.

An improved system 110 for advancing the wire is illustrated in FIGS. 5 to 7. Once again there is the motor 10 of FIG. 1, which drives an endless screw 98 and indirectly a first pinion 99, which itself transmits its movement to two parallel sprockets 100, whose teeth extend at the ends and which carry in the centre, between the toothed sectors 101, a smooth portion 102 in which there is a groove 103, which is penetrated by the wire 8 and permits a better movement thereof. Idle rollers 104 extend beneath the sprockets 100, in front of the grooves 103 and force the wire 8 to pass into these grooves. In addition a screwing chuck 105 is placed beneath the pinion 99 and the wire 8 traverses it and is therefore straightened between the grooves 103 and the rollers 104, in order to eliminate the curvature movements which it might have acquired on the reel 7 and which would have disturbed its advance due to undulations which could have taken place in the wire guide 9 and consequent friction on its walls.

It is also appropriate to ensure that this advance system 110 does not slip and that the wire 8 is really driven or displaced, which can stop if it twists and becomes locked in the wire guide 9. Thus, a coder 106 is provided, whereof a graduated wheel is pressed against the wire 8, maintained straight by means of an opposite roller 107, close to one of the rollers 104. The wire 8 turns the graduated wheel on advancing and the computer 2 gives the alarm if the coder 106 informs it that the wire 8 has stopped. Other screwing chucks 108 are located between the rollers 104, the coder 106 and the ends of the wire guide 9 in order to continue to appropriately guide the wire 8.

An improved distance regulator 111 is illustrated in FIGS. 8 and 9. It has certain of the elements of the preceding regulator 45 and they appear therein with the same reference numerals, although they are arranged differently. In this case the motor 80 is connected to a reduction gear 112 by a pair of pulleys 113, 114 joined by a belt 115. An output shaft 116 of the reduction gear 112 carries three, stacked, circular cams 117a, 117b and 117c. Each of the cams 117 has a hollowed out, angular sector 118a, 118b or 118c and is located in front of one of the sensors 79 and 89, in front of which it rotates, in such a way that a follower member 119 of the sensor in question is released when it extends in front of the hollowed out sector 118 of the cam 117, but is otherwise forced back by the cam 117.

The hollowed out sectors 118 define the references of the travel of the distance regulator 111. In the position of FIG. 8, the mid-stroke sensor 89 has its follower member 119 against the edge of the hollowed out sector 118a of the cam 117a. A clockwise rotation of the output shaft 116 would release the follower member 119, which would mean that passage had taken place into the other half of the travel. This rotation can be continued until the follower member 119 of one of the end of travel sensors 79 is forced back by the edge of the hollowed out sector 118c of the cam 117c. This sensor is here designated 79c. An opposite rotation is then permitted. The follower member 119 of the other end of travel sensor 79b would then arrive at the edge of the hollowed out sector 118b of the cam 117 and would be released, indicating the opposite travel end. It is pointed out that the ends of travel are marked by opposite movements of the follower members 119 of the sensors 79 (release and thrust) and that the mid-travel or stroke sensor 89 still indicates in which travel half it is located, which supplies redundant informations due to different signals for making more reliable the distance regulation of the torches 20.

Screws 120 join the cams 117 to one another and to a pinion 121 of the output shaft 116, which is responsible for driving the rack. The angular and axial sliding actions of the cams 117 are consequently prevented.

Finally, the torch 20b is illustrated in FIGS. 10 and 11. It is in particular remarkable by its regulation and control possibilities, so that it can be used for different and sometimes difficult tasks such as welding in hollows or depressions. Its nose has a flange 125 for screwing to the rack 76 and from which rises a rib 126, which receives a pivot 127 and a circular arc recess 128. However, the main part of the torch 20b is a shaft 129 terminated at the rear by a fork 130 articulated to the pivot 127 and whose branches are joined by a bolt 131, which passes into the recess 128. When the bolt is tightened, the fork 130 grips the rib 126 and maintains the orientation of the shaft 129.

The shaft 129 is as smooth as possible so that there is no risk of it catching if it has to be introduced into a space in the part. The wire guide 43 is for this reason enclosed in a cutout 132 of the shaft 129 over most of its length, with the exception of the end, but this feature makes it possible to easily regulate its length. It is provided with a rack 133 on a small portion in a widening of the cutout 132 and a toothed spindle 134 and a screw head, traversing the shaft 129, meshes with the rack 133 and thus permits the advance or moving back of the wire guide 43 solely with the aid of a screwdriver. A screw 135, which also passes through the shaft 129 and somewhat to the rear of the spindle 134, can then be turned in order to jam the wire guide 43.

In this case the wire guide 43 is connected at the rear by a flexible section 136, which can end in the funnel 81 of FIG. 4. In a similar way, flexible tubes 137 connect the shaft 129 to the assembly plate 46 for supplying fluids and electricity. The shaft 129 has not shown cutouts extending the flexible tubes up to the electrode 90. In addition, there is a cutout 138, which is axial but issues onto the outside at the front by a bias orifice 139 directed towards the end of the wire guide 43 and the electrode 90. It is possible to introduce into it an endoscope 140, which monitors the correct, performance of the welding.

The torch 20b is equipped with a dismantlable nozzle 142. Thus, it is useful not to have to repeat the settings of the torch 20b if it is necessary to replace the electrode 90 or the gas diffusing grid 143, which rapidly becomes dirty. Thus, the nozzle 142 is joined to the shaft 129 by an internal screw 144, to which access is obtained by removing a short screw 145, which is coaxial and has a larger diameter and serves as a cover. The short screw 145 leaves free a chamber 146 located in front of the internal screw 144 and which occupies the centre of the nozzle 142. Into it issue gas supply cutouts 147 extending those of the shaft 129 and which therefore ensure a satisfactory performance of the welding operation. The chamber 146 issues to the outside by a group of cutouts 148 placed around the electrode 90.

In even more favourable manner, it is possible to merely withdraw the electrode 90 and the grid 143 if one of its parts is out of use, without it being necessary to remove or replace the entire nozzle 142. A ball 149 displaced by a not shown spring towards the electrode 90 then locks the latter. However, it can be extracted by pulling it, which also leads to the displacement of the grid 143, which is integral with the electrode 90, but not the diffuser mouthpiece 150. A new electrode-grid assembly can then be put into place by thrust action. This design offers the supplementary advantages that the torches can be made more compact than in existing solutions where the electrodes are held by clips. The different diffuser elements can be constructed more easily from different materials such as brass or stainless steel.

We claim:

1. Automatic welding installation comprising a robot arm (1) provided with a control device (2) and an assembly face (13) for a random number of welding torches (20) provided with an assembly face (47), and a rack (21) provided with stowing locations (23) for the torches (20), the arm (1) comprising a magazine (7) for filler wire (8), a wire advance device (10, 11, 110), a conduit for guiding the wire (8) fixed to the assembly face (13) and a means (63 to 65) for the automatic, reversible locking of each of the torches (20) to the arm (1), the assembly faces of the arm and the torches comprising engaging means (49, 62) having a single assembly position for which, with the assembly faces coupled and the locking completed, the guide conduit of the wire of the locked torch is in the extension of the guide conduit of the arm wire, characterized in that the torches comprise a mobile nose (40) connected to another part (44) of the torches (20), to which belongs the assembly face (47), by a mechanical, distance regulating connection (45), a guide conduit (43) for the wire of the torches constituted by a part (73) fixed to the nose and a part (72) fixed to the other part (44) of the torches, the two parts (72, 73) of the guide conduit sliding in one another.

2. Automatic welding installation according to claim 1, characterized in that the torches comprise a nozzle (42) for housing an electrode carried by the nose jointly with the wire guidance conduit.

3. Automatic welding installation according to claim 1, characterized in that the torches and arms comprise fluid supply conduits (50) flush with the assembly faces and connected to the assembly position.

4. Automatic welding installation according to claim 1, characterized in that it has flexible conduits (28) for the supply of the torches (20) at a height dominating the torches.

5. Automatic welding installation according to claim 4, characterized in that it has a bracket constituted by an overhanging beam (30) rotating about a vertical post (29) and along which slide elastic suspensions (32, 33) of the flexible conduits (28).

6. Automatic welding installation according to claim 1, characterized in that the engaging means comprise two pins (62) and two cutouts (49) and the locking means has a jack for the simultaneous extension of lugs (64) in a groove (66) of a recess (48) made in the assembly face (47) of the torches (20).

7. Automatic welding installation according to claim 1, characterized in that the torches (20) carry at least one pair of pins (53 or 54) pointing on two opposite sides and the stowing locations (23) of the racks (21) consist of cavities having pin-supporting, projecting surfaces (57).

8. Automatic welding installation according to claim 7, characterized in that elastic strips (58) provided with a deformed portion (59) in order to retain the pins (53 or 54) are fixed to the projecting surfaces by one end.

9. Automatic welding installation according to claim 1, characterized in that the rack (21) has a wire cutter (14).

10. Automatic welding installation according to claim 1, characterized in that the torches comprise identification systems (51, 61) connected to the control device (2) when the torches are assembled with the arm.

11. Automatic welding installation according to claim 1, characterized in that the arm and the torches comprise electric lines (83, 84) flush with the assembly faces (13, 47) and connected to the assembly position connecting the control device to the mechanical distance regulating connection.

12. Automatic welding installation according to claim 1, characterized in that the part (73) fixed to the nose (40) of the wire guiding conduit (71) tapers in front of the arm wire guiding conduit (9).

13. Automatic welding installation according to claim 1, characterized in that the mechanical distance regulating connection (45) has position indications (79, 89) for the connection.

14. Automatic welding installation according to claim 13, characterized in that the position indicators comprise two end of travel indicators (79) and a mid-stroke indicator (89) of a mobile part (79) of the connection.

15. Automatic welding installation according to claim 14, characterized in that the position indicators are controlled by separate, integral cams (117).

16. Automatic welding installation according to claim 15, characterized in that the mid-stroke indicator (89) is controlled by a cam having a shape such that it brings about two different signals of the mid-stroke indicator (89) on two halfs of the stroke.

17. Automatic welding installation according to claim 13, characterized in that the end of travel indicators (79) are designed so as to emit different signals at the travel ends which they respectively indicate.

18. Automatic welding installation according to claim 1, characterized in that the advance device for the wire (110) has wire straightening means.

19. Automatic welding installation according to claim 18, characterized in that the wire straightening means consists of a pair of wire advance sprockets (100), a pair of rollers (104) respectively located in front of the sprockets, the wire being compressed between the sprockets and the rollers and a screwing chuck (105) between the sprockets and between the rollers.

20. Automatic welding installation according to claim 18, characterized in that the wire advance device (110) has a displacement sensor (106) with a roller (107) pressed against the wire.

21. Automatic welding installation according to claim 1, characterized in that certain of the torches (20b) comprise a means (133, 134) for regulating the advance position of the wire guide (43).

22. Automatic welding installation according to claim 1, characterized in that certain of the torches (20b) have an orientation-regulatable nose (125 to 131).

23. Automatic welding installation according to claim 1, characterized in that certain of the torches (20b) have a detachable nozzle (142).

24. Automatic welding installation according to claim 1, characterized in that certain of the torches comprise a cavity (138) for the passage of an endoscope (140).

25. Automatic welding installation according to claim 1, characterized in that certain of the torches (20b) are constructed with an electrode (90) integral with a diffusion grid (143) and held on the nozzle (142) by a locking ball system (150).

* * * * *